(12) United States Patent
Roylance et al.

(10) Patent No.: US 10,841,713 B2
(45) Date of Patent: Nov. 17, 2020

(54) INTEGRATION OF AUDIOGRAM DATA INTO A DEVICE

(71) Applicant: Sorenson IP Holdings, LLC, Salt Lake City, UT (US)

(72) Inventors: Shane A. Roylance, Farmington, UT (US); James Rollins, Lehi, UT (US); Hansen Phangia, Salt Lake City, UT (US); Thomas Robert Stringham, Salt Lake City, UT (US)

(73) Assignee: Sorenson IP Holdings, LLC, Salt Lake City, UT (US)

( * ) Notice: Subject to any disclaimer, the term of this patent is extended or adjusted under 35 U.S.C. 154(b) by 0 days.

(21) Appl. No.: 16/122,549

(22) Filed: Sep. 5, 2018

(65) Prior Publication Data
US 2019/0007775 A1    Jan. 3, 2019

Related U.S. Application Data

(63) Continuation of application No. 15/444,917, filed on Feb. 28, 2017, now Pat. No. 10,085,096.
(Continued)

(51) Int. Cl.
*H04R 25/00* (2006.01)
*G10L 15/26* (2006.01)

(52) U.S. Cl.
CPC ............ *H04R 25/356* (2013.01); *G10L 15/26* (2013.01); *H04R 25/353* (2013.01); *H04R 25/70* (2013.01); *H04R 25/55* (2013.01); *H04R 2225/55* (2013.01)

(58) Field of Classification Search
CPC .... H04R 25/356; H04R 25/353; H04R 25/70; H04R 25/55; H04R 2225/55; G10L 15/26
See application file for complete search history.

(56) References Cited

U.S. PATENT DOCUMENTS

| 5,303,306 A | * | 4/1994 | Brillhart ............. H04R 25/558 381/312 |
| 5,406,633 A | | 4/1995 | Miller et al. |

(Continued)

FOREIGN PATENT DOCUMENTS

DE    102007033484 A1    1/2009

OTHER PUBLICATIONS

Examination Report received in European Application No. 17 857 239.2 dated Oct. 1, 2019.
(Continued)

*Primary Examiner* — Sunita Joshi
(74) *Attorney, Agent, or Firm* — Maschoff Brennan

(57) ABSTRACT

A computer-implemented method to integrate audiogram data into a device may include obtaining audiogram data including a first amplification value for each of multiple first frequencies. In some embodiments, the first amplification values may be configured to compensate for hearing loss of a user. The method may also include translating the audiogram data to amplification settings for multiple audio frequencies. A number of the multiple audio frequencies may be less than a number of the multiple first frequencies. The method may further include associating the amplification settings with a user profile of the user in a transcription system and directing the amplification settings from the transcription system to a device associated with the user profile. The method may also include applying the amplification settings to audio output by the device.

19 Claims, 9 Drawing Sheets

Related U.S. Application Data

(60) Provisional application No. 62/402,188, filed on Sep. 30, 2016.

(56) References Cited

U.S. PATENT DOCUMENTS

| | | |
|---|---|---|
| 8,447,042 B2 | 5/2013 | Gurin |
| 8,712,067 B2 | 4/2014 | Semcken |
| 2008/0008070 A1 | 1/2008 | Kwon |
| 2011/0051942 A1* | 3/2011 | Wilson .................. A61B 5/12 |
| | | 381/60 |
| 2011/0200217 A1* | 8/2011 | Gurin .................. A61B 5/123 |
| | | 381/320 |
| 2014/0314261 A1* | 10/2014 | Selig .................. H04R 25/70 |
| | | 381/314 |
| 2015/0049876 A1 | 2/2015 | Kim et al. |

OTHER PUBLICATIONS

Search Report received in International Application No. PCT/US2017/053036, dated Nov. 29, 2017.

\* cited by examiner

INTEGRATION OF AUDIOGRAM DATA INTO A DEVICE

CROSS-REFERENCE TO RELATED APPLICATION

This patent application is a continuation of U.S. patent application Ser. No. 15/444,917, filed on Feb. 28, 2017, which claims priority to U.S. Provisional Patent Application No. 62/402,188, filed on Sep. 30, 2016, the disclosures of each of which are hereby incorporated herein by reference in their entireties.

FIELD

The embodiments discussed herein are related to integration of audiogram data into a device.

BACKGROUND

Hearing capabilities of users of communication devices may vary from user to user. Typical communication devices have a fixed frequency response for audio output by the communication device, except for a volume control that equally affects all of the frequencies of the output audio.

The subject matter claimed herein is not limited to embodiments that solve any disadvantages or that operate only in environments such as those described above. Rather, this background is only provided to illustrate one example technology area where some embodiments described herein may be practiced.

SUMMARY

A computer-implemented method to integrate audiogram data into a device is provided. The method may include obtaining audiogram data including a first amplification value for each of multiple first frequencies. In some embodiments, the first amplification values may be configured to compensate for hearing loss of a user. The method may also include translating the audiogram data to amplification settings for multiple audio frequencies. A number of the multiple audio frequencies may be less than a number of the multiple first frequencies. The method may further include associating the amplification settings with a user profile of the user in a transcription system and directing the amplification settings from the transcription system to a device associated with the user profile. The method may also include applying the amplification settings to audio output by the device.

BRIEF DESCRIPTION OF THE DRAWINGS

Example embodiments will be described and explained with additional specificity and detail through the use of the accompanying drawings in which.

DESCRIPTION OF EMBODIMENTS

Hearing loss may occur at different frequencies in different people. For example, some individuals may have hearing loss at frequencies between 1000 Hz and 2000 Hz, while other individuals may have hearing loss at frequencies between 2000 Hz and 3000 Hz.

To compensate for the hearing loss of an individual, the frequencies at which the individual is experiencing hearing loss may first be determined. For example, a device, such as an audiometer may be used to determine the specific hearing loss of an individual. The audiometer may output information regarding the specific hearing loss of an individual as audiogram data. The audiogram data may be used by devices that output audio to amplify the audio at the frequencies in which hearing loss has occurred for the individual.

In some circumstances, the device that may be used to determine the specific hearing loss of an individual may have more granularity than a device that outputs audio for the individual. For example, the device may determine hearing loss of an individual at fifteen frequencies, while the device that outputs audio for the individual may be configured to adjust the amplification level at five frequencies. Some embodiments of the present disclosure may describe a system and/or method to obtain audiogram data of an individual, translate the audiogram data for use in a device with a frequency granularity that is different than the audiogram data, and provide the translated audiogram data to the device. The device may use the translated audiogram data to amplify the output audio to help compensate for the hearing loss of the individual.

Figure 1:
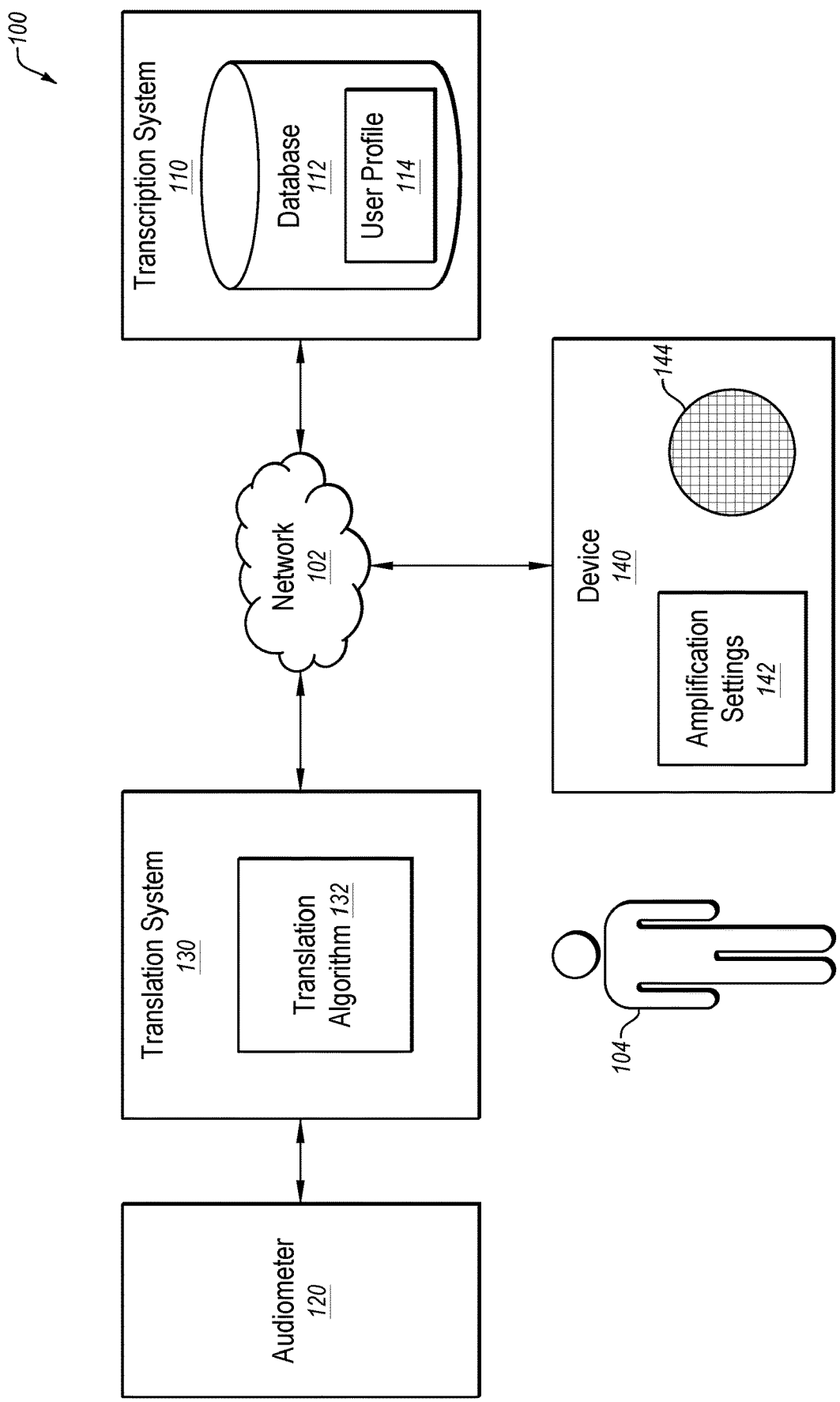
FIG. 1 illustrates an example environment related to integrating audiogram data into a device.

FIG. 1 illustrates an example environment 100 related to integrating audiogram data into a device. The environment 100 may be arranged in accordance with at least one embodiment described in the present disclosure. The environment 100 may include a network 102, a user 104, a transcription system 110 that includes a database 112 and a user profile 114, an audiometer 120, a translation system 130 that includes a translation algorithm 132, and a device 140 that includes amplification settings 142 and a speaker 144.

The network 102 may be configured to communicatively couple the transcription system 110 with the device 140 and to communicatively couple the transcription system 110 with the translation system 130.

In some embodiments, the network 102 may be any network or configuration of networks configured to send and receive communications between devices. In some embodiments, the network 102 may include a conventional type network, a wired or wireless network, and may have numerous different configurations. Furthermore, the network 102 may include a local area network (LAN), a wide area network (WAN) (e.g., the Internet), or other interconnected data paths across which multiple devices and/or entities may communicate. In some embodiments, the network 102 may include a peer-to-peer network. The network 102 may also be coupled to or may include portions of a telecommunications network for sending data in a variety of different communication protocols. In some embodiments, the network 102 may include Bluetooth® communication networks or cellular communication networks for sending and receiving communications and/or data including via short message service (SMS), multimedia messaging service (MMS), hypertext transfer protocol (HTTP), direct data connection, wireless application protocol (WAP), e-mail, etc. The network 102 may also include a mobile data network that may include third-generation (3G), fourth-generation (4G), long-term evolution (LTE), long-term evolution advanced (LTE-A), Voice-over-LTE ("VoLTE") or any other mobile data network or combination of mobile data networks. Further, the network 102 may include one or more IEEE 802.11 wireless networks.

In some embodiments, the transcription system 110 may include any configuration of hardware, such as processors, servers, and databases that are networked together and configured to generate transcripts by transcribing audio data received over the network 102. For example, the transcription system 110 may include multiple computing systems, such as multiple servers that each include memory and at least one processor, which are networked together and configured to perform operations as described in this disclosure, among other operations. In some embodiments, the transcription system 110 may include computer-readable-instructions that are configured to be executed by the transcription system 110 to perform operations described in this disclosure.

In some embodiments, the transcription system 110 may be configured to transcribe audio data received from the device 140 to generate transcripts of the audio data. The transcription system 110 may provide the transcripts of the audio data to the device 140.

The device 140 may be any electronic or digital device. For example, the device 140 may include a desktop computer, a laptop computer, a smartphone, a mobile phone, a tablet computer, a phone console, or any other processing device. The device 140 may be configured to broadcast audio data through the speaker 144 to the user 104. The audio data may be amplified before being broadcast based on the amplification settings 142.

In some embodiments, the device 140 may be further configured to send the audio data to the transcription system 110 and to receive transcripts of the audio data from the transcription system 110. The device 140 may be configured to present the transcripts of the audio data to the user 104. The transcripts may assist the user 104 to understand the audio data. The amplification settings 142 may also assist the user to understand the audio data when it is broadcast by the speaker 144. The amplification settings 142 may assist the user 104 as the amplification settings 142 may increase the amplification or volume of the audio data when the audio data is broadcast. The amplification settings 142 may include amplification settings for multiple frequencies, each at a different amplification. Thus, the amplification settings 142 may alter the frequency response of audio broadcast or output by the device 140. In some embodiments, the amplification settings 142 may assist the user to understand the audio data when the user 104 is hearing impaired by amplifying frequencies of the audio data that correspond to frequencies of hearing loss by the user.

Figure 2A:
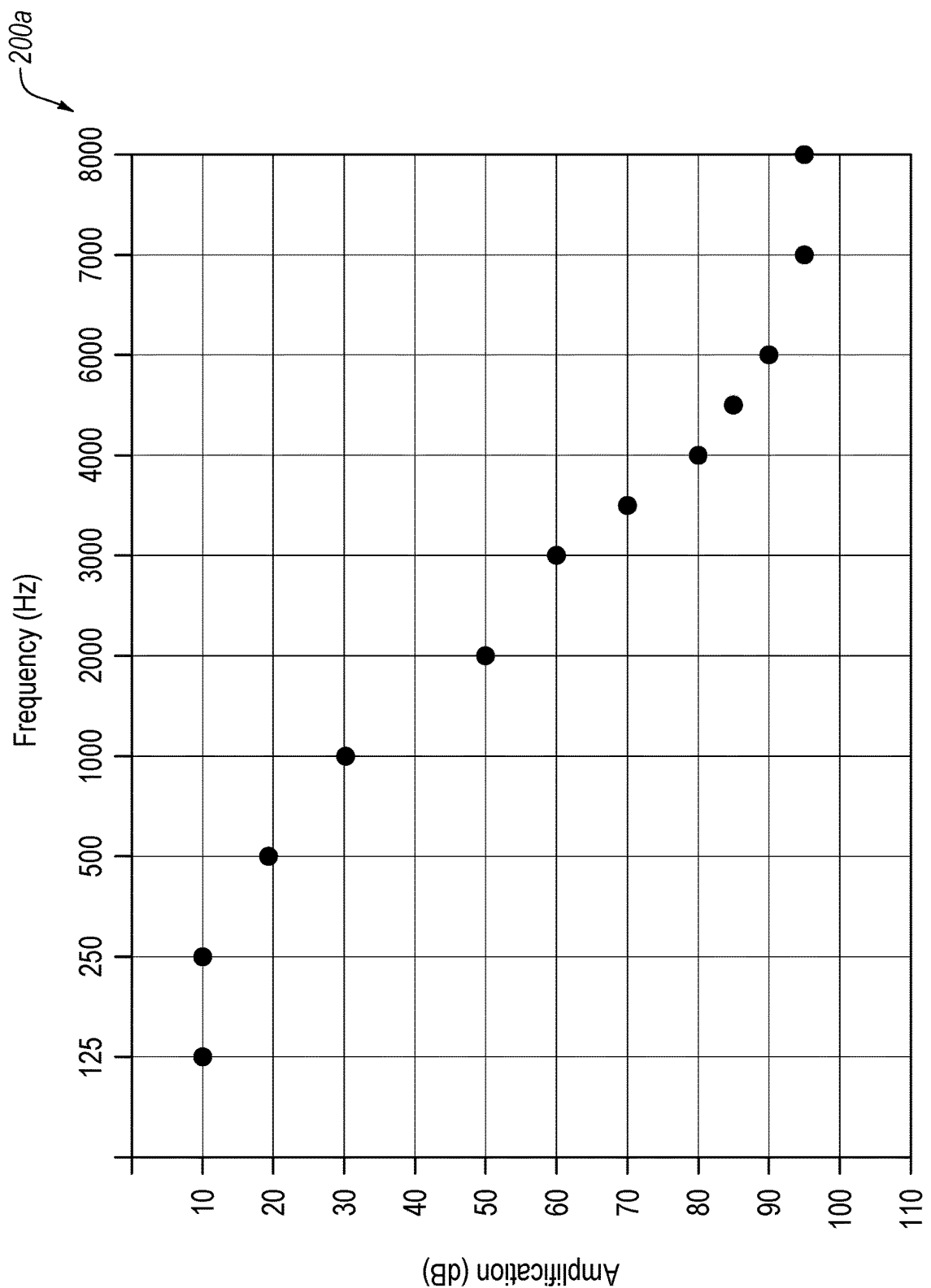
FIG. 2a illustrates a graph with audiogram data with multiple amplification values.
Figure 2B:
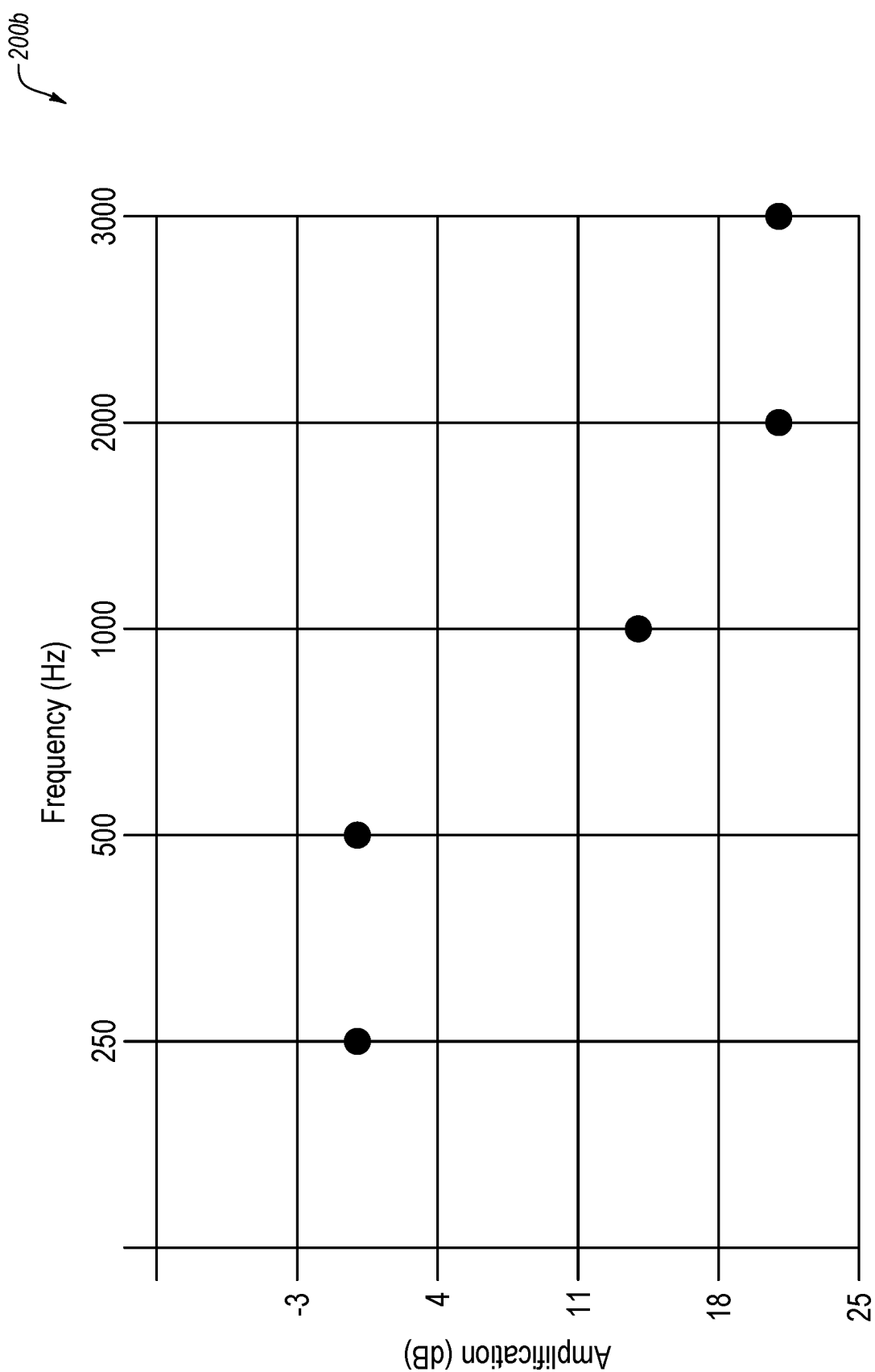
FIG. 2b illustrates a graph with amplification settings for a device.

For example, in some embodiments, the amplification settings 142 may include between 2 and 25 frequencies or frequency ranges, such a 3, 5, 6, 8, or 10, 15, 20, or 25 frequencies or frequency ranges, or some other number of frequencies or frequency ranges. Each of the frequencies or frequency ranges may be amplified differently in an amplification range between −20 and 50 dB. Alternatively or additionally, each of the frequencies may be amplified in a range between −3 and 25 dB. A specific example of the amplification settings 142 in graph form is illustrated in FIG. 2b.

The audiometer 120 may be configured to evaluate hearing acuity of individuals, such as the user 104. The audiometer 120 may be a combination of hardware/software that is configured to evaluate the hearing acuity of individuals. In some embodiments, the audiometer 120 may be configured to transmit recorded sounds such as pure tones or speech to the headphones of an individual at varying frequencies and intensities. The audiometer 120 may solicit a response from the individual based on the recorded sounds. For example, the individual may indicate that the sound is not audible, that the sound is soft, loud, or some other response. The audiometer 120 may record the responses of the individual to produce audiogram data. In some embodiments, the audiometer 120 may be a pure tone audiometer or a Bekesy type audiometer.

In some embodiments, the audiometer 120 may provide sounds at multiple frequencies in a range of frequencies that may be heard by humans. For example, the multiple frequencies may range between 0 Hz and 8 KHz. Alternatively or additionally, the multiple frequencies may range between 20 Hz and 6 KHz, or some other range of frequencies.

An individual being tested by the audiometer 120 may provide feedback with respect to each of the multiple frequencies. Using the feedback from the individual, the audiometer 120 may generate the audiogram data. The audiogram data may indicate an amount of amplification that may be applied to sound generated by the audiometer 120 for an individual to hear the sound at each of the multiple frequencies. For example, the audiogram data may include between 2 and 25 frequencies, such as 2, 4, 6, 8, 10, 12, 15, or 25 frequencies, or some other number of frequencies. Each of the frequencies may be associated with an amplification level that may range between −20 and 120 dB, or some other range such as between −20 and 100 dB, −20 and 75 dB, −3 and 75 dB, −3 and 50, and −3 and 40 dB. The amplification level may be a level of amplification that may be applied to sound for the individual to hear the specific frequency of the sound based on a baseline level of the sound. Thus, the audiogram data may indicate hearing loss of the individual at the specific frequencies. A specific example of audiogram data in graph form is illustrated in FIG. 2a. After generating the audiogram data, the audiometer 120 may provide the audiogram data to the translation system 130.

As described, in some embodiments, the device 140 may include the amplification settings 142 that may be used to amplify audio data presented to the user 104. In these and other embodiments, the amplification settings 142 may be generic amplification settings. In some embodiments, it may be beneficial to have the amplification settings 142 tuned to the hearing loss of the user 104. In these and other embodiments, by tuning the amplification settings 142 to the hearing loss of the user 104, the user 104 may be better able to understand audio data presented by the device 140.

The audiometer 120, as described, may generate audiogram data regarding the hearing loss of the user 104. However, the audiogram data from the audiometer 120 may include more granularity with respect to hearing loss at individual frequencies than the amplification settings 142 of the device 140. Furthermore, the amplification indicated by the audiogram data for one or more frequencies may be greater than the amplification that may be provided by the device 140. Thus, for the device 140 to apply the audiogram data to the amplification settings 142, the audiogram data may be first translated or converted.

The translation system 130 may be configured to translate or convert the audiogram data to the amplification settings 142 used by the device 140. The translation system 130 may include any configuration of hardware, such as processors, memory, and other hardware that are coupled together and configured to translate the audiogram data into the amplification settings 142. In some embodiments, the translation system 130 may include a translation algorithm 132 that may be used by the translation system 130 to translate the audiogram data to the amplification settings 142.

In some embodiments, the translation system 130 may be configured to present the audiogram data and the amplification settings 142 based on the audiogram data to a user of the translation system 130. In these and other embodiments, the translation system 130 may be used by an audiologist or some other professional, doctor, or knowledgeable person that helps to operate the audiometer 120 to generate the audiogram data. The translation system 130 may obtain a confirmation regarding the amplification settings 142 based on the audiogram data. In these and other embodiments, the confirmation may be obtained based on user input from the person that helps to operate the audiometer 120. Thus, the amplification settings 142 may be verified by a knowledgeable person before being provided to the device 140.

In some embodiments, the translation system 130 may be running software configured to manage the audiogram data. In these and other embodiments, the software may be the NOAH software by the Hearing Instrument Manufacturers' Software Association (HIMSA) that is based in Copenhagen Denmark. In these and other embodiments, the translation algorithm 132 may be part of a software component that operates in conjunction with the NOAH software. For example, the translation algorithm 132 may be part of a plug-in that interacts with the NOAH software. The translation algorithm 132 may be configured to obtain the audiogram data from the NOAH software and to convert the audiogram data to the translation algorithm 132. The plug-in may also be configured to perform other operations. For example, the plug-in may direct the translation system 130 to present the amplification settings 142 and provide an ability for the person that helps to operate the audiometer 120 to accept, e.g., verify, the amplification settings 142 based on the audiogram data. Alternatively or additionally, the plug-in may direct the translation system 130 to present amplification settings 142 and provide an ability for the person to interact with the translation system 130 to alter the amplification settings 142 based on the audiogram data.

In some embodiments, the plug-in or other part of the translation system 130 may be further configured to direct the amplification settings 142 through the network 102 to the transcription system 110. In these and other embodiments, the amplification settings 142 may be provided by way of an electronic communication. For example, the amplification settings 142 may be provided by an email, text, or other messaging type. Alternatively or additionally, the transcription system 110 may include an application program interface (API) to allow the translation system 130 to interface and communicate directly with the transcription system 110 over the network 102. In these and other embodiments, the translation system 130 may provide the amplification settings 142 to the transcription system 110 using the API.

In some embodiments, the amplification settings 142 may be provided with information about the user 104 from which the audiogram data was generated. For example, the transcription system 110 may include a list of registered users of the transcription system 110. The translation system 130 may obtain information about the user 104 from which the audiogram data was generated, such as a name or other identifier. The translation system 130 may indicate the name or other identifier of the user 104 to the transcription system 110.

In some embodiments, the transcription system 110 may determine a user profile 114 of the user 104 identified by the translation system 130. For example, the database 112 may include user profiles of users associated with the transcription system 110. The database 112 may be searchable based on names or other identifiers of the user associated with the user profiles. In some embodiments, the transcription system 110 may query the database 112 using the name or other identifier to determine the user profile 114 associated with the user 104 identified by the translation system 130. After identifying the user profile 114, the transcription system 110 may be configured to store the amplification settings 142 in the user profile 114 of the user 104 in the database 112.

As discussed, the translation algorithm 132 may be configured to translate the audiogram data to the amplification settings 142. In some embodiments, the audiogram data may include more frequencies than the amplification settings 142. In these and other embodiments, one or more of the audiogram frequencies of the audiogram data may be grouped together and each group of the audiogram frequencies may be associated with one or more of the settings frequencies of the amplification settings 142.

The audiogram amplification values for the audiogram frequencies that are grouped together in a first group may be used to generate the settings amplification values for the one or more settings frequencies associated with the first group of audiogram frequencies. In an analogous fashion, the audiogram amplification values for the audiogram frequencies that are grouped together in other groups may be used to generate the settings amplification values for the one or more settings frequencies associated with each of the other groups of audiogram frequencies. In some embodiments, the settings amplification values may be a mean, medium, or mode of the audiogram amplification values. Alternatively or additionally, the settings amplification values may be generated based on a formula or formulas applied to the audiogram amplification values. For example, in some embodiments, the audiogram amplification values may be higher than the settings amplification values. In these and other embodiments, a formula to generate the settings amplification values may reduce the audiogram amplification values to generate the settings amplification values.

In some embodiments, the formula may be such that when a mean, medium, mode, or other combination of the audiogram amplification values are within particular ranges that the settings amplification values are set based on the range in which the audiogram amplification values are found. In these and other embodiments, the settings amplification values may be selected based on the range of the settings amplification values being proportional to the range of the audiogram amplification values. For example, assume the audiogram amplification values range between −3 and 110 dB and that the settings amplification values range between −3 and 25 dB. Thus, every 4 dB change in the audiogram amplification values may result in a 1 dB change in the settings amplification values. Thus, an average audiogram amplification value of 25 dB would translate to a 6 dB setting amplification value. Alternately or additionally, the settings amplification values may be proportional to the range of the audiogram amplification values, with some offset. Alternatively or additionally, the proportional amount may change based on an increase in the audiogram amplification values such that the proportion is higher for lower audiogram amplification values and lower for higher audiogram amplification values. In these and other embodiments, the settings amplification values may be proportional to the range of the audiogram amplification values based on a logarithmic type scale.

Alternatively or additionally, the settings amplification values may be a particular value based on the audiogram amplification values being within a particular range. For example, when the audiogram amplification values are within a first range of values, the settings amplification value may be a first particular value. When the audiogram amplification values are within a second range of values, the settings amplification value may be a second particular value. The particular values may be selected based on the first and second ranges. For example, the particular values may be selected based on the amplification capabilities of the device 140. In these and other embodiments, the audiogram data may be grouped and divided by a particular amount based on the amplification capabilities of the device 140. The particular amount may be further based on the processing capabilities of the processing system of the device 140. For example, the processing system of the device 140 may be 8 bit, 16 bit, 24 bit, 32 bit, or some other processing capability. Thus, the particular amount by which the audiogram data is divided may be selected based on the audiogram data, the capabilities of the device 140, and the capabilities of the processing system.

An example formula that may be used by the translation algorithm 132 for the amplification settings 142 is now provided.

First, the audiogram frequencies f1 to fX, where X is the total number of audiogram frequencies, may be grouped into three frequency groups, F1, F2, and F3, where:

$F1<=X;$ $X<F2<=Y;$ and $Y<F3,$ where X and Y are numbers between 0 and 8 KHz.

A mean, mode, median, or other combination of the audiogram amplification values of the frequencies of each of the three frequency groups F1, F2, and F3 may be determined. An example of the mean of the audiogram amplification values is provided. For example, for a mean, F1={f1, f2, f3, f4}, where f1, f2, f3, and f4 are frequencies in the frequency group F1. The frequencies f1, f2, f3, and f4 may include corresponding amplification values a1, a2, a3, and a4. As a result, the mean amplification of the group F1 may be (a1+a2+a3+a4)/4.

The mean of the audiogram frequency groups F1, F2, and F3, may be used to determine a setting amplification value for each of the frequency groups, where M represents a mean of the audiogram frequency groups F1, F2, and F3:

If M<=A, then the setting amplification value of the frequency group=A1;

If A<M<=B, then the setting amplification value of the frequency group=B1;

If B<M<=C, then the setting amplification value of the frequency group=C1;

If C<M, then the setting amplification value of the frequency group=D1, where A, B, and C are within the amplification ranges of the amplification values of the audiogram data and A1, B1, C1, and D1 are the setting amplification values. The A1, B1, C1, and D1 setting amplification values may be selected based on the amplification range of the device using the setting amplification values, such as the device 140. In these and other embodiments, the setting amplification values may be selected based on the audiogram amplification values as described previously.

The frequencies of the amplification settings 142 may be assigned setting amplification values based on a relationship between the frequencies of the amplification settings 142 and the frequencies of the three groups, F1, F2, and F3. For example, the frequencies of the amplification settings 142 that are less than or equal to X may be assigned an amplification value equal to the setting amplification value for F1, the frequencies of the amplification settings 142 that are more than X but less than or equal to Y may be assigned an amplification value equal to the setting amplification value for F2, and the frequencies of the amplification settings 142 that are more than Y may be assigned an amplification value equal to the setting amplification value for F3. Alternatively or additionally, the audiogram frequencies may be grouped into fewer or more than three groups. Thus, the amplification settings 142 for the device 140 may be determined based on the audiogram data from the audiometer 120. An example of the translation algorithm is provided with respect to FIG. 2b.

As discussed previously, the transcription system 110 may be configured to receive the amplification settings 142 from the translation system 130 and to store the amplification settings 142 in the user profile 114 of the user 104 in the database 112. In these and other embodiments, the transcription system 110 may use the user profile 114 to determine a device associated with the user profile 114. For example, the user profile 114 may include a network address or other identifier of the device 140 associated with the user profile 114. In some embodiments, the transcription system 110 may provide the amplification settings 142 to the device 140 over the network 102 based on the device 140 being associated with the user profile 114.

The device 140 may receive the amplification settings 142. The device 140 may implement the amplification settings 142 and amplify audio data broadcast by the speaker 144 according to the amplification settings 142. Thus, the device 140 may adjust the frequency response of audio data broadcast by the speaker 144 based on an audio profile of the user 104 associated with device 140. As a result, the user 104 may be able to better hear the audio data broadcast by the speaker 144.

In some embodiments, the transcription system 110 may provide the amplification settings 142 during a set-up of the device 140. Alternatively or additionally, the transcription system 110 may provide the amplification settings 142 after receiving the amplification settings 142. Alternatively or additionally, the transcription system 110 may provide the amplification settings 142 in response to recalibration or other event that may affect the amplification settings 142 of the device 140.

An example of the operation of the elements in the environment 100 is now provided. The user 104 may be hearing impaired. The user 104 may visit a doctor, such as an audiologist to have their hearing evaluated. The audiometer 120 may be used to evaluate the hearing of the user 104. The audiometer 120 may generate audiogram data that may indicate hearing loss of the user 104. The audiogram data may be a hearing loss profile of the user 104. The audiogram data may indicate how much amplification may be needed at different frequencies to compensate for the hearing loss of the user 104. The audiogram data may be provided to the translation system 130.

The translation system 130 may convert the audiogram data to the amplification settings 142. The translation system 130 may further display the amplification settings 142 and the audiogram data. The audiologist may adjust and confirm the amplification settings 142. The translation system 130 may provide the amplification settings 142 along with an identification of the user 104 to the transcription system 110 over the network 102. The transcription system 110 may determine the user profile 114 associated with the user 104. Based on the user profile 114, the transcription system 110 may determine that the device 140 is associated with the user 104. The transcription system 110 may provide the amplification settings 142 to the device 140 over the network 102. The device 140 may apply the amplification settings 142 to audio data broadcast over the speaker 144 to enhance an ability of the user 104 to hear the audio data.

Modifications, additions, or omissions may be made to the environment 100 without departing from the scope of the present disclosure. For example, the translation algorithm 132 may be part of the transcription system 110 and not part of the translation system 130. In these and other embodiments, the environment 100 may not include the translation system 130. For example, the audiometer 120 may provide the audiogram data to the transcription system 110. The transcription system 110 may use the translation algorithm 132 to generate the amplification settings 142 based on the received audiogram data. Alternatively or additionally, the translation system 130 may be included in the environment 100 but the transcription system 110 may generate the amplification settings 142 based on audiogram data and send the amplification settings 142 to the translation system 130 for confirmation, verification, or changes by a user of the translation system 130. After confirmation, the transcription system 110 may provide the amplification settings 142 to the device 140.

FIG. 2a illustrates a graph 200a with audiogram data with multiple amplification values. The graph 200a illustrates the audible threshold for standardized frequencies as measured by an audiometer. The Y axis may represent an intensity measured in decibels and the X axis may represent frequency measured in Hertz. As illustrated in the graph 200a, the audiogram data includes the following points: 10 dB at 125 Hz, 10 dB at 250 Hz, 20 dB at 500 Hz, 30 dB at 1000 Hz, 50 dB at 2000 Hz, 60 dB at 3000 Hz, 70 dB at 3500 Hz, 80 dB at 4000 Hz, 85 dB at 5000 Hz, 90 dB at 6000 Hz, 95 dB at 7000 Hz, and 95 dB at 8000 Hz.

FIG. 2b illustrates a graph 200b with amplification settings for a device. The Y axis may represent an intensity measured in decibels and the X axis may represent frequency measured in Hertz. As illustrated in the graph 200b, the values include the following points: 0 dB at 250 Hz, 0 dB at 500 Hz, 14 dB at 1000 Hz, 21 dB at 2000 Hz, 21 dB at 3000 Hz. The values of the graph 200b may be generated based on the values from the graph 200a based on the audiogram data. An example using the equation described in FIG. 1 to generate the amplification settings in the graph 200b, is now provided using the amplification values from the graph 200a.

In this example, X=500 Hz, Y=2000 Hz, A=20, A1=0, B=50, B1=14, C1=90, C1=21, and D1=25. Thus, F1 includes the following points: 10 dB at 125 Hz, 10 dB at 250 Hz, 20 dB at 500 Hz and the mean for F1 is 13.33. F2 includes the following points: 30 dB at 1000 Hz, 50 dB at 2000 Hz and the mean for F2 is 40. F3 includes the following points: 60 dB at 3000 Hz, 70 dB at 3500 Hz, 80 dB at 4000 Hz, 85 dB at 5000 Hz, 90 dB at 6000 Hz, 95 dB at 7000 Hz, and 95 dB at 8000 Hz, and the mean of F3 is 82.14. Thus, the setting amplification value for F1=0, the setting amplification value for F2=14, and the setting amplification value for F3=21.

Frequencies 250 Hz and 500 Hz would be included in the frequency group of F1 and thus have an amplification value of 0. Frequency 1000 Hz would be included in the frequency group of F2 and thus has an amplification value of 14. Frequencies 2000 Hz and 3000 Hz would be included in the frequency group of F3 and thus have an amplification value of 21.

Figure 3A:
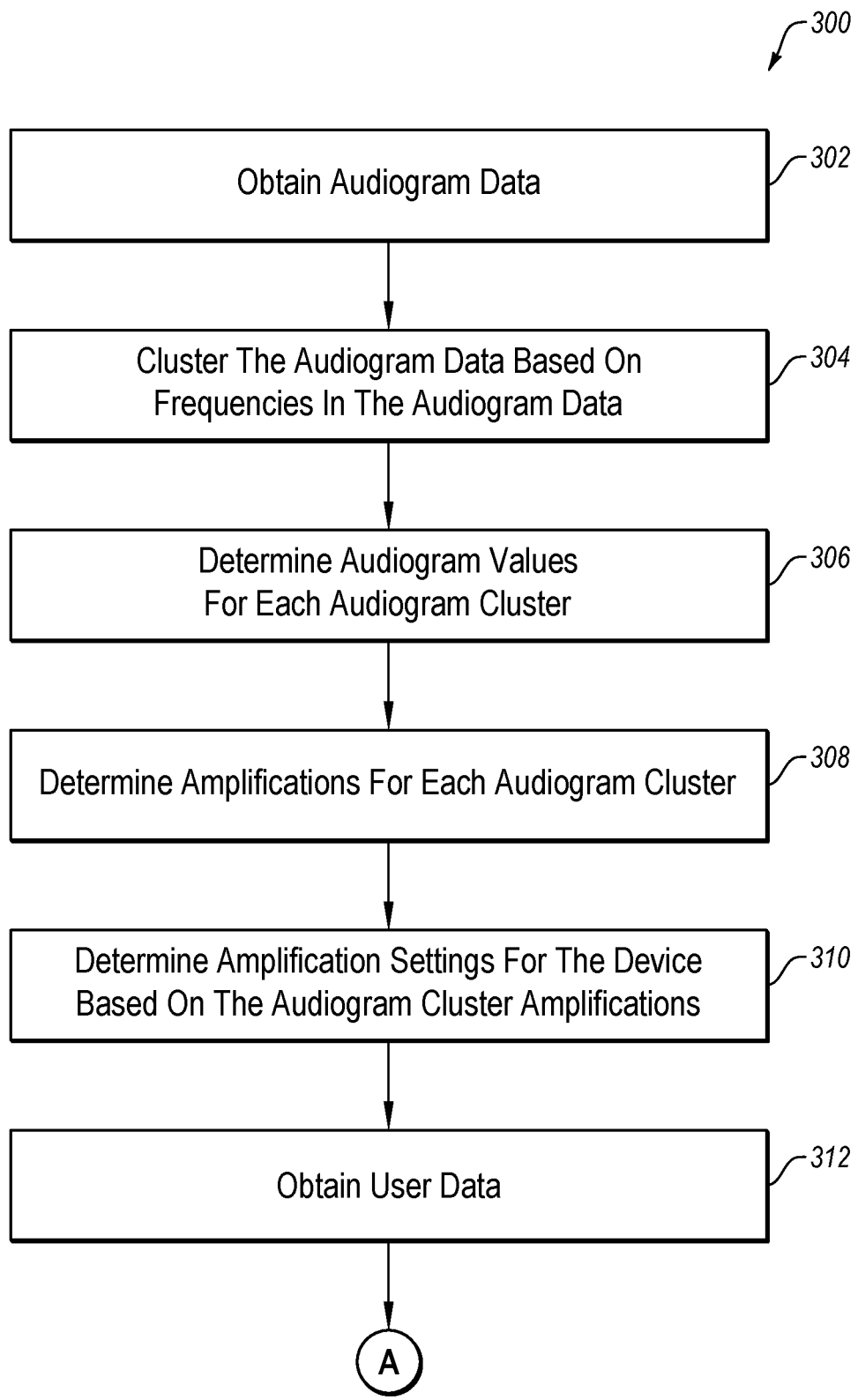
FIGS. 3a and 3b illustrate a flowchart of an example computer-implemented method to integrate audiogram data into a device.
Figure 3B:
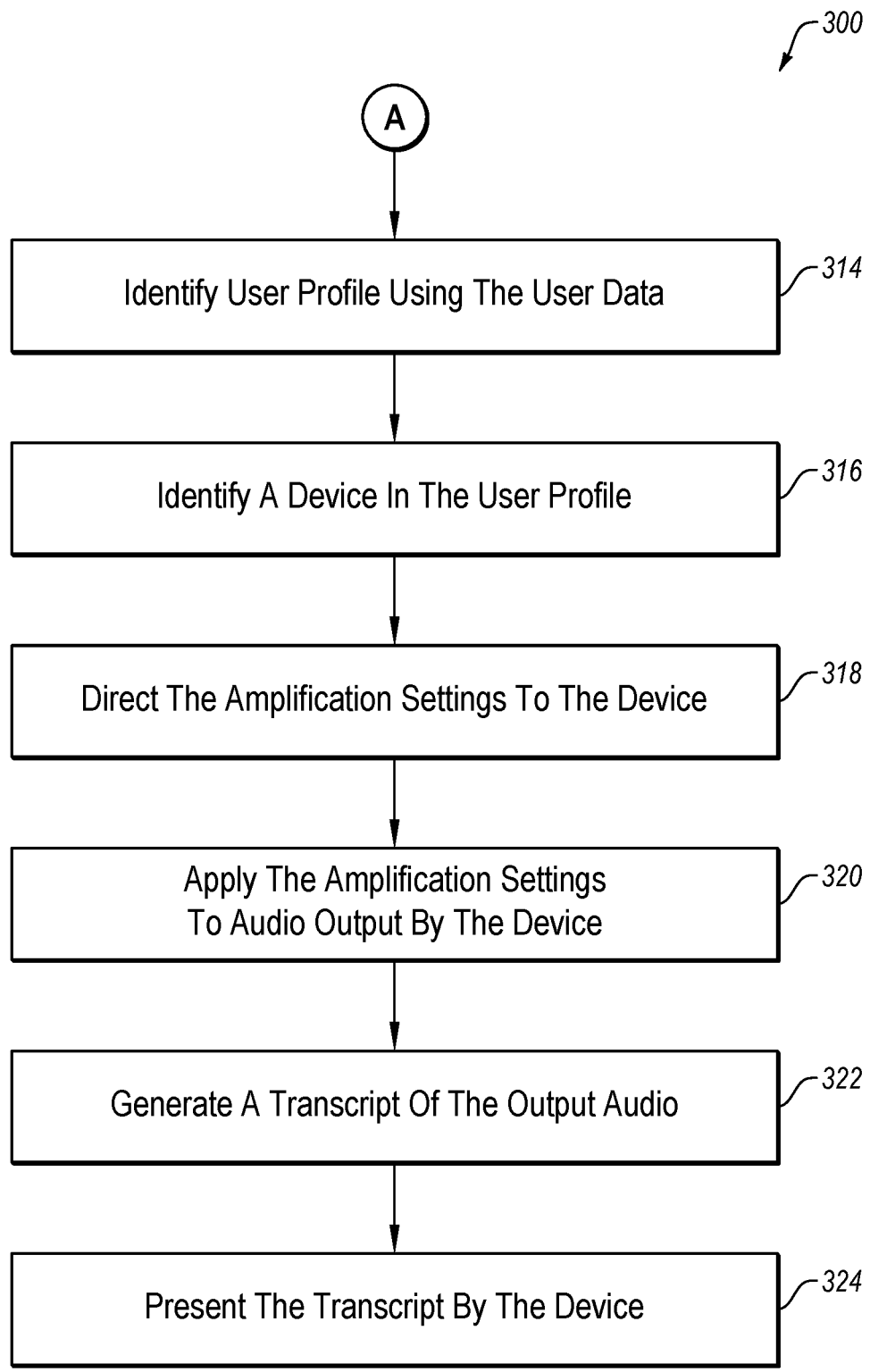

FIGS. 3a and 3b illustrate a flowchart of an example computer-implemented method 300 to integrate audiogram data into a device. The method 300 may be arranged in accordance with at least one embodiment described in the present disclosure. The method 300 may be performed, in whole or in part, in some embodiments by a system and/or environment, such as the environment 100, the system 600, and/or the communication system 700 of FIGS. 1, 6, and 7, respectively. In these and other embodiments, the method 300 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 300 may begin at block 302, where audiogram data may be obtained. In some embodiments, the audiogram data may indicate hearing loss of the individual at multiple specific frequencies. For example, the audiogram data may indicate an amount of amplification that may be applied to sound generated by a device at a baseline amplification for an individual to hear the sound at each of the multiple frequencies. In some embodiments, the audiogram data may be obtained from an audiometer or other device.

In block 304, the audiogram data may be clustered based on frequencies in the audiogram data. For example, the audiogram data may include data for multiple frequencies. In some embodiments, frequencies that are near other frequencies may be clustered together.

In block 306, audiogram values for each audiogram cluster may be determined. In some embodiments, the audiogram values for each audiogram cluster may be determined based on a mean, medium, mode, or some other combination of the individual audiogram values in each audiogram cluster. In some embodiments, the audiogram values may be an amount of amplification that may be applied to sound generated by a device at a baseline amplification for the individual to hear the sound at each of the multiple frequencies. In some embodiments, the audiogram values may be in decibels.

In block 308, amplifications for each audiogram cluster may be determined based on the audiogram values for the audiogram cluster. For example, the amplifications for each cluster may be a particular value based on the audiogram values being within a particular range. Alternatively or additionally, the amplifications for each cluster may be a proportion of the audiogram values for the corresponding cluster. For example, the audiogram values for an audiogram cluster of 1000 to 2000 Hz may be 75 dB and the amplification may be 1/5 of the audiogram values such that the amplification is 15 dB for an audiogram cluster of 1000 to 2000 Hz.

In block 310, amplification settings for the device based on the audiogram cluster amplifications may be determined.

For example, the device may include amplification settings at multiple frequencies. The amplification settings for each of the frequencies may be the amplifications determined for the audiogram cluster that includes the frequencies. For example, if an audiogram cluster includes frequencies between 1000 and 2000 Hz and has an amplification determined of 15 dB, an amplification setting of the device for frequencies between 1000 and 2000 Hz may be 15 dB.

In block 312, user data may be obtained. The user data may include an identifier of the user that may be used by a system to identify the user or a user profile associated with the user.

In block 314, a user profile may be obtained using the user data. In some embodiments, the user profile may include information about the user and a device associated with the user.

In block 316, a device in the user profile may be identified. In block 318, the amplification settings may be directed to the device. In block 320, the amplification settings may be applied to audio output by the device. In these and other embodiments, the device may obtain the amplification setting and configure the audio output system of the device to use the amplification settings.

In block 322, a transcript of the output audio may be generated. In some embodiments, the transcript of the output audio may be generated by a translation system separate from the device. In block 324, the transcript may be presented by the device. In these and other embodiments, the transcript may be provided to the device by the translation system. The device may present the transcript to a user of the device.

One skilled in the art will appreciate that, for these processes, operations, and methods, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

Figure 4:
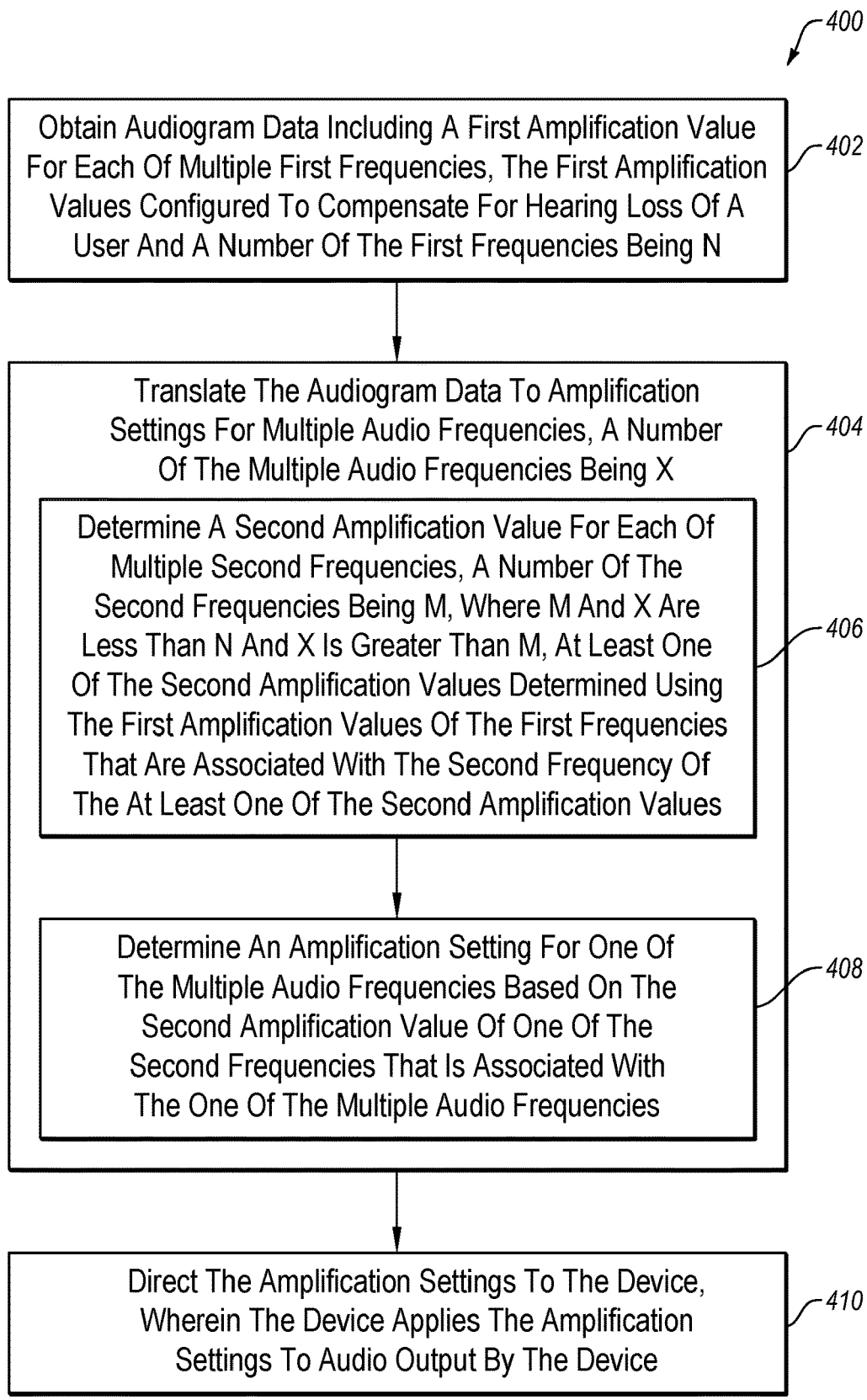
FIG. 4 is a flowchart of an example computer-implemented method to integrate audiogram data into a device.

FIG. 4 is a flowchart of an example computer-implemented method 400 to integrate audiogram data into a device. The method 400 may be arranged in accordance with at least one embodiment described in the present disclosure. The method 400 may be performed, in whole or in part, in some embodiments by a system and/or environment, such as the environment 100, the system 600, and/or the communication system 700 of FIGS. 1, 6, and 7, respectively. In these and other embodiments, the method 400 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 400 may begin at block 402, where audiogram data including a first amplification value for each of multiple first frequencies may be obtained. The first amplification values may be configured to compensate for hearing loss of a user and a number of the first frequencies may be N.

In block 404, the audiogram data may be translated to amplification settings for multiple audio frequencies. In some embodiments, a number of the multiple audio frequencies may be X.

In block 406, in some embodiments, translating the audiogram data of block 404 may include determining a second amplification value for each of multiple second frequencies. In these and other embodiments, a number of the second frequencies may be M. In these and other embodiments, M and X may be less than N and X may be greater than M. In some embodiments, at least one of the second amplification values may be determined using the first amplification values of the first frequencies that are associated with the second frequency of the at least one of the second amplification values. In some embodiments, X may be 2, 3, 4, 5, 6, 8, 10, 12, 15, 20, 30, 40 or some other number and the amplification settings may be between first value and a second value, where the first value may range between −10 dB and 10 dB and the second value may range between 10 dB and 50 dB.

In block 408, in some embodiments, translating the audiogram data of block 404 may include determining an amplification setting for one of the multiple audio frequencies based on the second amplification value of one of the second frequencies that is associated with the one of the multiple audio frequencies In block 410, the amplification settings may be directed to the device. In these and other embodiments, the device may apply the amplification settings to audio output by the device.

One skilled in the art will appreciate that, for these processes, operations, and methods, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 400 may further include obtaining a verification of the amplification settings before directing the amplification settings to the device.

In some embodiments, the method 400 may also include identifying a user profile of the user based on information about the user; and identifying the device based on the device being included in the user profile of the user before directing the amplification settings to the device. In these and other embodiments, identifying the user profile of the user and identifying the device may be performed by a transcription system. Alternatively or additionally, the audio output by the device may include speech that may be transcribed by the transcription system and the transcription of the speech may be displayed by the device. In these and other embodiments, the method 400 may further include providing the amplification settings over a network to the transcription system from a translation system. In these and other embodiments, obtaining audiogram data and translating the audiogram data to amplification settings may be performed by the translation system.

Figure 5:
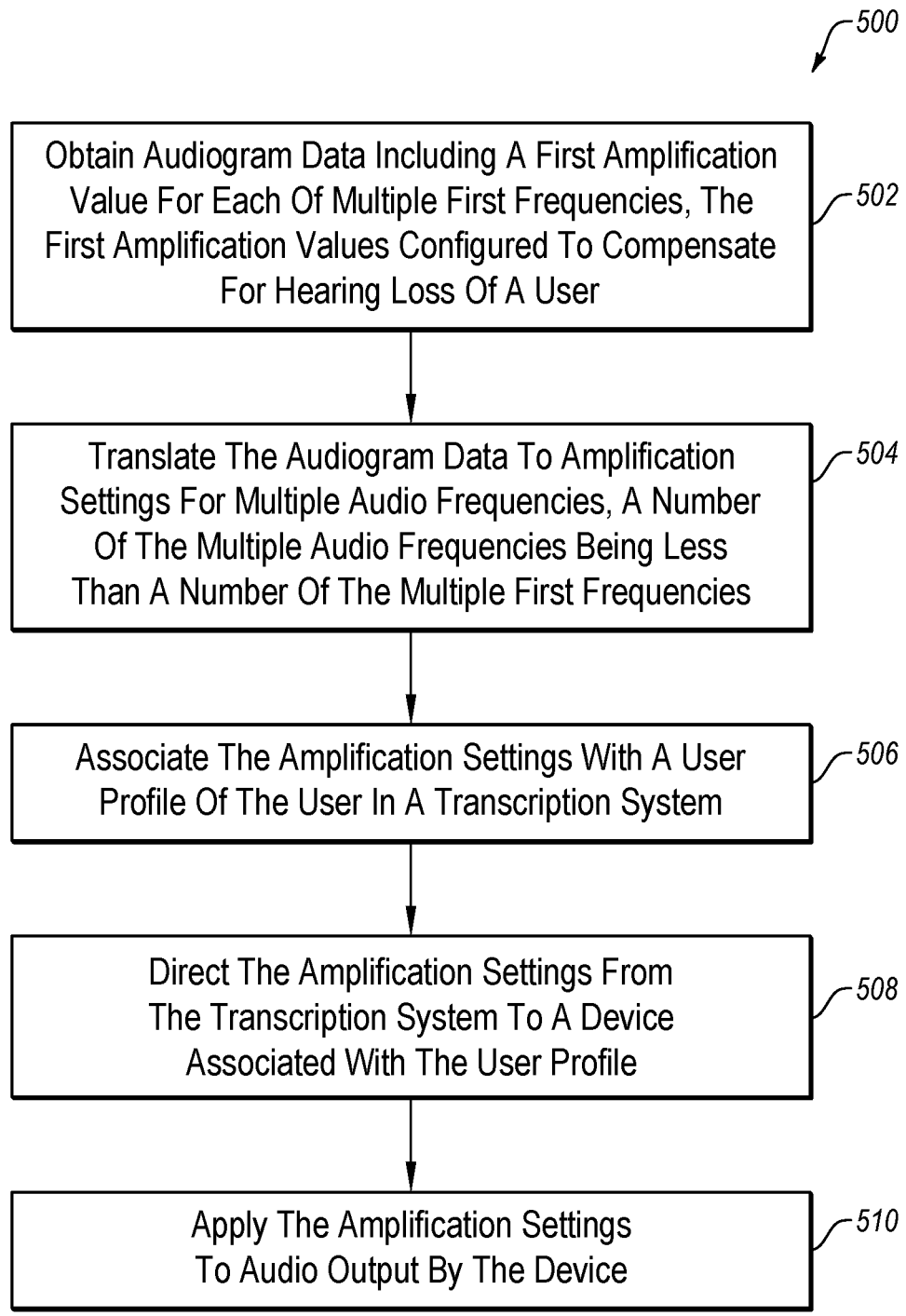
FIG. 5 is a flowchart of another example computer-implemented method to integrate audiogram data into a device.

FIG. 5 is a flowchart of an example computer-implemented method 500 to integrate audiogram data into a device. The method 500 may be arranged in accordance with at least one embodiment described in the present disclosure. The method 500 may be performed, in whole or in part, in some embodiments by a system and/or environment, such as the environment 100, the system 600, and/or the communication system 700 of FIGS. 1, 6, and 7, respectively. In these and other embodiments, the method 500 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 500 may begin at block 502, where audiogram data including a first amplification value for each of multiple first frequencies may be obtained. In some embodiments, the first amplification values may be configured to compensate for hearing loss of a user.

In block 504, the audiogram data may be translated to amplification settings for multiple audio frequencies. In some embodiments, a number of the multiple audio frequencies may be less than a number of the multiple first frequencies. For example, a number of the first frequencies may be N and a number of the multiple audio frequencies may be X. In these and other embodiments, the translating may include determining a second amplification value for each of multiple second frequencies. In some embodiments, a number of the second frequencies may be M, where M and X may be less than N and X may be greater than M. In these and other embodiments, at least one of the second amplification values may be determined using the first amplification values of the first frequencies that are associated with the second frequency of the at least one of the second amplification values. In some embodiments, the translating may further include determining an amplification setting for one of the multiple audio frequencies based on the second amplification value of one of the second frequencies that is associated with the one of the multiple audio frequencies. In these and other embodiments, N may be 3, 4, 5, 6, 8, 10, 12, 15, 20, 30, 40, or some other number, M may be 1, 2, 4, 5, 6, 8, 10, 12, 15, 20, 30, 40, or some other number, X may be 2, 3, 4, 5, 6, 8, 10, 12, 15, 20, 30, 40 or some other number, and the amplification settings may be between a first value and a second value, where the first value may range between −10 dB and 10 dB and the second value may range between 10 dB and 50 dB.

In block 506, the amplification settings may be associated with a user profile of the user in a transcription system. In block 508, the amplification settings may be directed from the transcription system to a device associated with the user profile.

In block 510, the amplification settings may be applied to audio output by the device. In some embodiments, the audio may include speech that is transcribed by the transcription system and the transcription of the speech may be displayed by the device.

One skilled in the art will appreciate that, for these processes, operations, and methods, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 500 may further include providing the amplification settings over a network to the transcription system from a translation system. In these and other embodiments, obtaining audiogram data and translating the audiogram data to amplification settings may be performed by the translation system. Alternatively or additionally, the method 500 may also include obtaining a verification of the amplification settings before associating the amplification settings with the user profile.

In some embodiments, the method 500 may also include identifying a user profile of the user based on information about the user and identifying the device based on the device being included in the user profile of the user before directing the amplification settings to the device.

Figure 6:
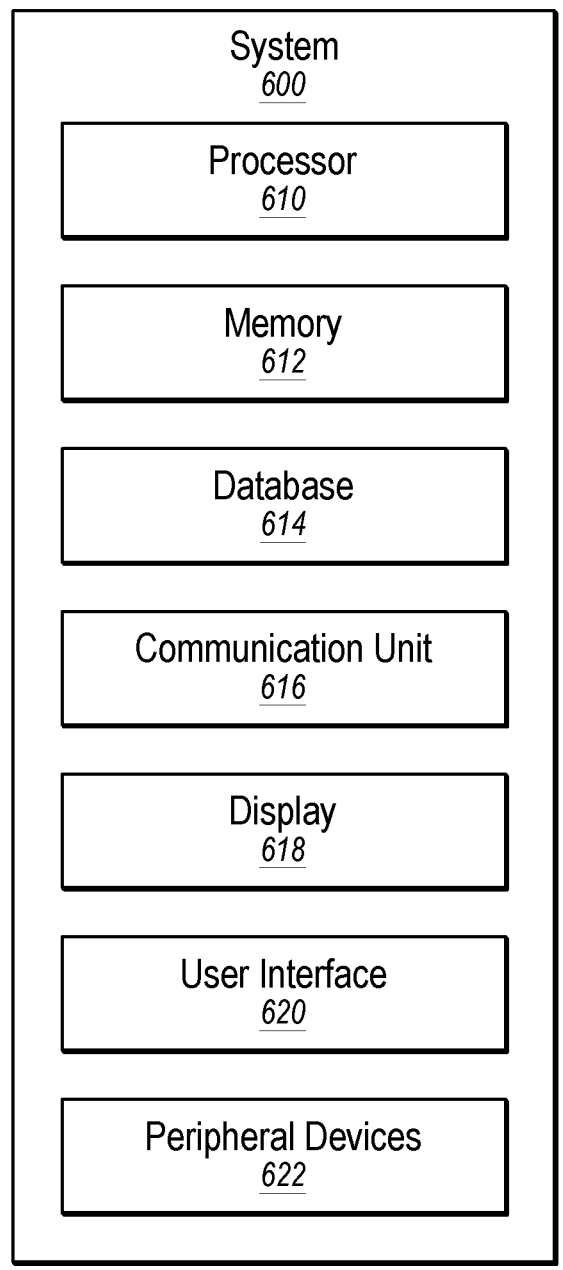
FIG. 6 illustrates an example computing system that may be used in a system configured to integrate audiogram data into a transcription system.

FIG. 6 illustrates an example computing system 600 that may be used in a system configured to integrate audiogram data into a transcription system. The system 600 may be arranged in accordance with at least one embodiment described in the present disclosure. The system 600 may include a processor 610, a memory 612, a database 614, a communication unit 616, a display 618, a user interface unit 620, and a peripheral device 622, which all may be communicatively coupled. In some embodiments, the system 600 may be part of any of the system or devices described in this disclosure. For example, the system 600 may be part of the translation system 130, the transcription system 110, or the device 140 of FIG. 1.

Generally, the processor 610 may include any suitable special-purpose or general-purpose computer, computing entity, or processing device including various computer hardware or software modules and may be configured to execute instructions stored on any applicable computer-readable storage media. For example, the processor 610 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 6, it is understood that the processor 610 may include any number of processors distributed across any number of networks or physical locations that are configured to perform individually or collectively any number of operations described herein. In some embodiments, the processor 610 may interpret and/or execute program instructions and/or process data stored in the memory 612, the database 614, or the memory 612 and the database 614. In some embodiments, the processor 610 may fetch program instructions from the database 614 and load the program instructions into the memory 612.

After the program instructions are loaded into the memory 612, the processor 610 may execute the program instructions. For example, the system 600 may be part of the translation system 130. In these and other embodiments, the translation algorithm 132 may be stored in the memory 612, loaded, and executed by the processor 610 to transform the audiogram data to the amplification settings 142.

As another example, the system 600 may be part of the transcription system 110. In these and other embodiments, the instructions may be used to determine the user profile 114 associated with the amplification settings 142 and to store the amplification settings 142 from the translation system 130 in the user profile 114. The instructions may also include directing the amplification settings 142 to the device 140.

The memory 612 and the database 614 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 610. By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 610 to perform a certain operation or group of operations as described in this disclosure.

The communication unit 616 may include any component, device, system, or combination thereof that is configured to transmit or receive information over a network. In some embodiments, the communication unit 616 may communicate with other devices at other locations, the same location, or even other components within the same system. For example, the communication unit 616 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, etc.), and/or the like. The communication unit 616 may permit data to be exchanged with a network and/or any other devices or systems described in the present disclosure. For example, if the system 600 is included in the device 140 of FIG. 1, the communication unit 616 may allow the device 140 to communicate with the transcription system 110 over the network 102 of FIG. 1.

The display 618 may be configured as one or more displays, like an LCD, LED, or other type of display. The display 618 may be configured to present video, text captions, user interfaces, and other data as directed by the processor 610. For example, when the system 600 is included in the translation system 130, the display 618 may be configured to present the audiogram data and the amplification settings 142 to a user of the translation system 130, such as an audiologist.

The user interface unit 620 may include any device that is configured to allow a user to interface with the system 600. For example, the user interface unit 620 may include a mouse, a track pad, a keyboard, and/or a touchscreen, among other devices. The user interface unit 620 may receive input from a user and provide the input to the processor 610.

The peripheral devices 622 may include one or more devices. For example, the peripheral devices may include a microphone, an imager, and/or a speaker, among other peripheral devices. In these and other embodiments, the microphone may be configured to capture audio. The imager may be configured to capture digital images. The digital images may be captured in a manner to produce video or image data. In some embodiments, the speaker may broadcast audio received by the system 600 or otherwise generated by the system 600. Modifications, additions, or omissions may be made to the system 600 without departing from the scope of the present disclosure.

Figure 7:
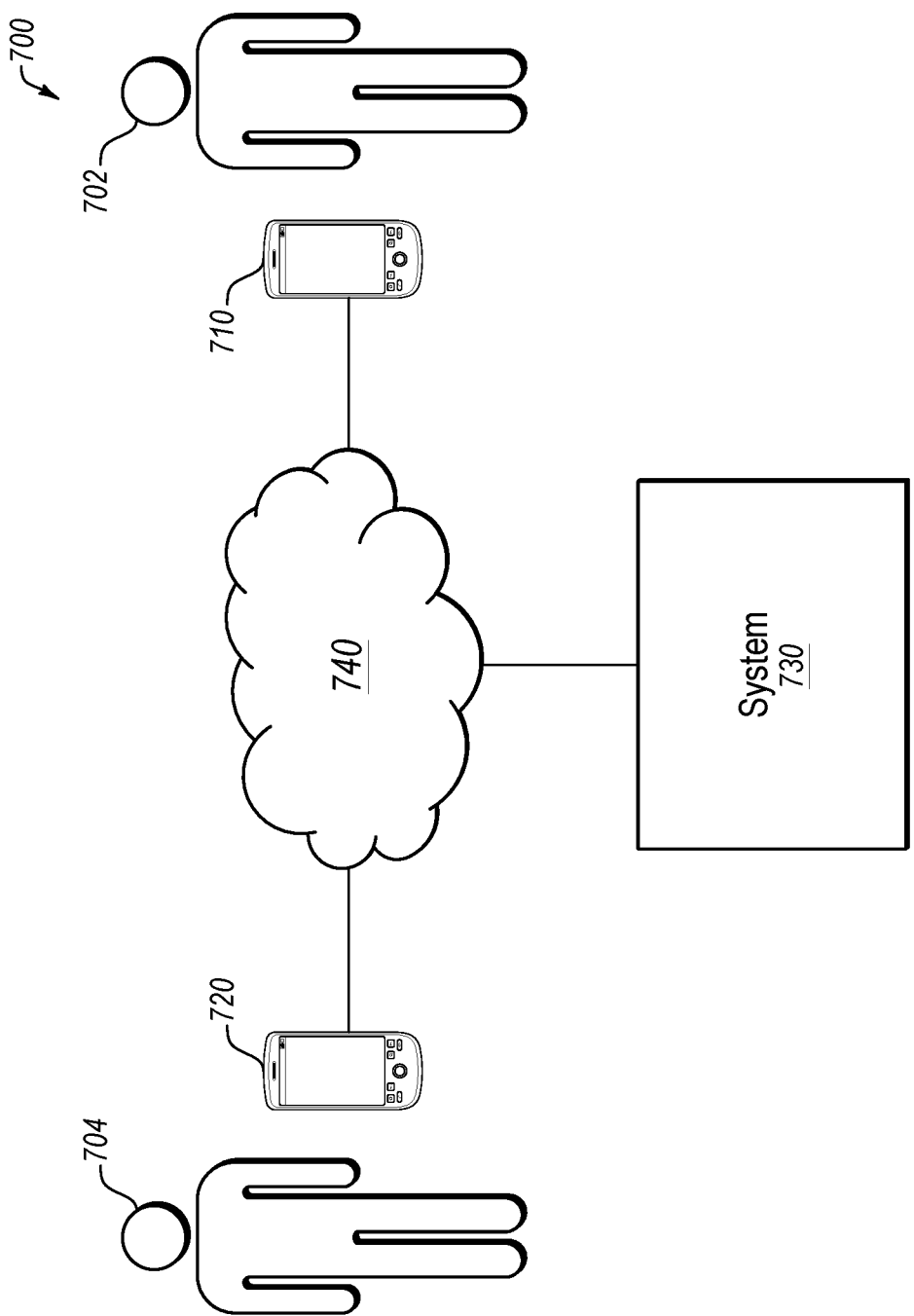
FIG. 7 illustrates an example communication system that may include a transcription system.

FIG. 7 illustrates an example communication system 700 that may provide transcriptions of a multimedia message. The communication system 700 may include an electronic device that is capable of sending a message. The communication system 700 may be arranged in accordance with at least one embodiment described in the present disclosure. The communication system 700 may include a first device 710, a second device 720, and a system 730. The first device 710 and the system 730 may be communicatively coupled by a network 740. Alternately or additionally, the first device 710 and the second device 720 may be communicatively coupled by the network 740. In some embodiments, the network 740 may be any network or configuration of networks configured to send and receive communications between systems and devices. In some embodiments, the network 740 may include a conventional type network, a wired or wireless network, and may have numerous different configurations. In some embodiments, the network 740 may also be coupled to or may include portions of a telecommunications network, including telephone lines, for sending data in a variety of different communication protocols, such as a plain old telephone system (POTS).

In some embodiments, the communication system 700 illustrated may be configured to facilitate an assisted call between a hearing-impaired user 702 and a second user 704. As used in the present disclosure, a "hearing-impaired user" may refer to a person with diminished hearing capabilities. Hearing-impaired users often have some level of hearing ability that has usually diminished over a period of time such that the hearing-impaired user can communicate by speaking, but that the hearing-impaired user often struggles in hearing and/or understanding others.

Alternatively or additionally, the communication system 700 illustrated may be configured to facilitate a call between a person with medical expertise and/or experience and the second user 704. As used in the present disclosure, a "person with medical expertise and/or experience" may be a nurse, doctor, or some other trained medical professional.

In some embodiments, a communication session, such as an audio or a video communication session, may be established between the first device 710 and the second device 720. In one example embodiment, the communication session may be a captioning communication session.

In some embodiments, the system 730 may be an assistive service, which is intended to permit a hearing-impaired person to utilize a communication network and assist their understanding of a conversation by providing text captions to supplement voice conversation occurring during communication sessions with other devices, such as the second device 720. Alternatively or additionally, the system 730 may be an assistive service to couple a person with medical expertise and/or experience with a person requesting medical assistance.

During a communication session, the system 730 and the first device 710 may be communicatively coupled using networking protocols. In some embodiments, during the communication session between the first device 710 and the second device 720, the first device 710 may provide the audio signal from the second device 720 to the system 730.

In some embodiments, at the system 730, a call assistant may listen to the audio signal of the second user 704 and "revoice" the words of the second user 704 to a speech recognition computer program tuned to the voice of the call assistant. In these and other embodiments, the call assistant may be an operator who serves as a human intermediary between the hearing-impaired user 702 and the second user 704. In some embodiments, text captions may be generated by the speech recognition computer as a transcription of the audio signal of the second user 704. The text captions may be provided to the first device 710 being used by the hearing-impaired user 702 over the network 740. The first device 710 may display the text captions while the hearing-impaired user 702 carries on a normal conversation with the second user 704. The text captions may allow the hearing-impaired user 702 to supplement the voice signal received from the second device 720 and confirm his or her understanding of the words spoken by the second user 704.

Modifications, additions, or omissions may be made to the communication system 700 without departing from the scope of the present disclosure. For example, in some embodiments, the second user 704 may be hearing impaired.

In these and other embodiments, the system 730 may provide text captions to the second device 720 based on audio data transmitted by the first device 710. Alternately or additionally, the system 730 may include additional functionality. For example, the system 730 may edit the text captions or make other alterations to the text captions after presentation of the text captions on the first device 710.

In some embodiments, the environments 100, 200, and/or 300 of FIGS. 1, 2, and 3, respectively, may be combined with the communication system 700. For example, the communication system 700 may facilitate live verbal captioning of a communication session and the transcription of media files of multimedia messages. For example, in some embodiments, a message with a media file may be sent from the second device 720 to the first device 710. The system 730 may be configured to provide text captions to the media file of the multimedia message along with performing the operations described with respect to FIG. 7.

As indicated above, the embodiments described herein may include the use of a special purpose or general purpose computer (e.g., the processor 610 of FIG. 6) including various computer hardware or software modules, as discussed in greater detail below. Further, as indicated above, embodiments described herein may be implemented using computer-readable media (e.g., the memory 612 or database 614 of FIG. 6) for carrying or having computer-executable instructions or data structures stored thereon.

In some embodiments, the different components, modules, engines, and services described herein may be implemented as objects or processes that execute on a computing system (e.g., as separate threads). While some of the systems and methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method to integrate information from an audiogram, the method comprising:

obtaining audiogram data of a single user including an amplification value for each of a plurality of first frequencies, the amplification values configured to compensate for hearing loss of the single user;

translating the audiogram data of the single user to amplification settings for the single user for a plurality of audio frequencies, a number of the plurality of audio frequencies being less than a number of the plurality of first frequencies, a first amplification setting for a first frequency of a first subset of the plurality of audio frequencies and a second amplification setting for a second frequency of the first subset of the plurality of audio frequencies both being based on a mathematical combination of a plurality of first amplification values of a first subset of the plurality of first frequencies, second amplification settings for a second subset of the plurality of audio frequencies being calculated using second amplification values of a second subset of the plurality of first frequencies and not using the plurality of first amplification values of the first subset of the plurality of first frequencies, and the first subset of the plurality of first frequencies being independent of the second subset of the plurality of first frequencies; and incorporating the amplification settings into a device that is associated with the single user and that is configured to be communicatively coupled to a transcription system such that the amplification settings are applied to audio output by the device.

2. The method of claim 1, wherein the audio includes speech that is transcribed by the transcription system and the transcription of the speech is displayed by the device.

3. The method of claim 1, further comprising providing the amplification settings over a network to the transcription system from a translation system, wherein obtaining audiogram data and translating the audiogram data to amplification settings are performed by the translation system.

4. The method of claim 1, wherein the number of the first frequencies is ten.

5. The method of claim 1, wherein the first amplification setting and the second amplification setting are both based on a ratio of the mathematical combination of the plurality of first amplification values of the first subset of the plurality of first frequencies.

6. The method of claim 5, wherein the ratio is less than one.

7. The method of claim 1, further comprising associating the amplification settings with a user profile of the user in the transcription system, wherein the device is associated with the user based on the user profile.

8. A system to integrate information from an audiogram, the system comprising:

one or more processors; and one or more computer-readable media coupled to the one or more processors, the one or more computer-readable media configured to store instructions that when executed by the one or more processors cause the system to perform operations, the operations comprising:

obtain audiogram data of a single user including an amplification value for each of a plurality of first frequencies, the amplification values configured to compensate for hearing loss of the single user;

translate the audiogram data of the single user to amplification settings for the single user for a plurality of audio frequencies, a number of the plurality of audio frequencies being less than a number of the plurality of first frequencies, a first amplification setting for a first frequency of a first subset of the plurality of audio frequencies and a second amplification setting for a second frequency of the first subset of the plurality of audio frequencies both being based on a mathematical combination of a plurality of first amplification values of a first subset of the plurality of first frequencies, second amplification settings for a second subset of the plurality of audio frequencies being calculated using second amplification values of a second subset of the plurality of first frequencies and not using the first amplification values of the first subset of the plurality of first frequencies, and the first subset of the plurality of first frequencies being independent of the second subset of the plurality of first frequencies; and direct the amplification settings to a device associated with the single user such that the amplification settings are applied to audio output by the device.

9. The system of claim 8, wherein the audio includes speech and the operations further comprise:

generate a transcription of the audio; and direct the transcription of the speech to the device such that the device presents the transcription of the speech concurrently with the audio output by the device.

10. The system of claim 8, wherein the operations further comprise associate the amplification settings with a user profile of the user in the system, wherein the device is associated with the user based on the user profile.

11. The system of claim 8, wherein the first amplification setting and the second amplification setting are both based on a ratio of the mathematical combination of the plurality of first amplification values of the first subset of the plurality of first frequencies.

12. One or more non-transitory computer-readable media configured to store instructions that when executed by a system cause or direct the system to perform operations, the operations comprising:

obtaining audiogram data of a single user including an amplification value for each of a plurality of first frequencies, the amplification values configured to compensate for hearing loss of the single user;

translating the audiogram data of the single user to amplification settings for the single user for a plurality of audio frequencies, a number of the plurality of audio frequencies being less than a number of the plurality of first frequencies, a first amplification setting for a first frequency of a first subset of the plurality of audio frequencies and a second amplification setting for a second frequency of the first subset of the plurality of audio frequencies both being based on a mathematical combination of a plurality of first amplification values of a first subset of the plurality of first frequencies, second amplification settings for a second subset of the plurality of audio frequencies being calculated using second amplification values of a second subset of the plurality of first frequencies and not using the first amplification values of the first subset of the plurality of first frequencies, and the first subset of the plurality of first frequencies being independent of the second subset of the plurality of first frequencies; and incorporating the amplification settings into a device that is associated with the single user and that is configured to be communicatively coupled to a transcription system such that the amplification settings are applied to audio output by the device.

13. The one or more non-transitory computer-readable media of claim 12, wherein the audio includes speech that is transcribed by the transcription system and the transcription of the speech is displayed by the device.

14. The one or more non-transitory computer-readable media of claim 12, wherein the first amplification setting and the second amplification setting are both based on a ratio of the mathematical combination of the plurality of first amplification values of the first subset of the plurality of first frequencies.

15. The one or more non-transitory computer-readable media of claim 14, wherein the ratio is less than one.

16. The one or more non-transitory computer-readable media of claim 12, wherein the operations further comprise providing the amplification settings over a network to the transcription system from a translation system, wherein obtaining audiogram data and translating the audiogram data to amplification settings are performed by the translation system.

17. The one or more non-transitory computer-readable media of claim 12, wherein the number of the first frequencies is ten.

18. The one or more non-transitory computer-readable media of claim 12, wherein the operations further comprise associating the amplification settings with a user profile of the user in the transcription system, wherein the device is associated with the user based on the user profile.

19. The system of claim 11, wherein the ratio is less than one.

* * * * *